United States Patent [19]
Kohn

[11] 3,766,488
[45] Oct. 16, 1973

[54] DYE LASER WITH PUMP CAVITY MODE MATCHED TO LASER RESONATOR

[75] Inventor: Roger Louis Kohn, Madison, N.J.

[73] Assignee: Bell Telephone Laboratories, Incorporated, Murray Hill, N.J.

[22] Filed: June 17, 1971

[21] Appl. No.: 153,983

[52] U.S. Cl. .................................. 331/94.5,
[51] Int. Cl. ..................... H01s 3/09, H01s 3/05 H01s/3/20
[58] Field of Search ............................ 331/94.5

[56] References Cited
UNITED STATES PATENTS
3,371,265  2/1968  Woodbury et al. .... 331/94.5 X;94.5
3,679,995  7/1972  Sorokin........................... 331/94.5
3,602,724  8/1971  Smith........................... 331/94.5 X OTHER PUBLICATIONS
Watson et al., IEEE J. of Quantum Electronics, Vol. 5, No. 6, June 1969, p. 353.
R & D Article in "Electronics" Vol. 36, No. 7, Feb. 15, 1963, pp. 74, 76, 78. TK 7800 E58
News Article in "Microwaves," Vol. 5, No. 11, p. 1966, p 16.
McFarland, "Applied Physics Letters," Vol. 10, No. 7, 1 April 1967, pp. 208–209.
Ohtsuka, "Osaka Univ. Tech. Reports," Vol. 17, Oct. 1963, pp. 277–284.
Birnbaum et al., "Applied Physics Letters," Vol. 12, No. 7, 1 April 1968, pp. 225–227. QC1A745
Yamaguchi et al., "Applied Physics Letters," Vol. 13, No. 4, 15 Aug. 1968, pp. 134–135. QC1A745
Maydan, "J. Applied Physics," Vol. 41, No. 4, 15 March 1970, pp. 1552–1559.

Primary Examiner—David Schonberg
Assistant Examiner—R. J. Webster
Attorney—W. L. Keefauver

[57] ABSTRACT

A new type of dye laser in which the dye cell is placed inside a pumping laser resonator is described. Both the dye laser radiation and the pumping laser radiation oscillate inside the same optical cavity. This design has the advantage of automatic alignment of the pumping laser and the pumped laser, as well as the reduction of the thermal problems. In the instance in which the laser frequencies do not differ greatly, automatic mode matching of the pumping laser beam and the pumped laser beam is obtained.

1 Claim, 5 Drawing Figures

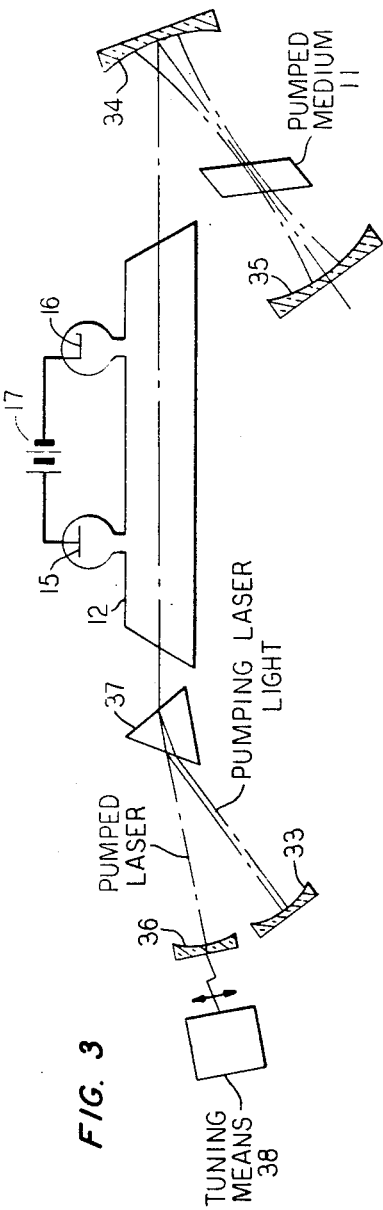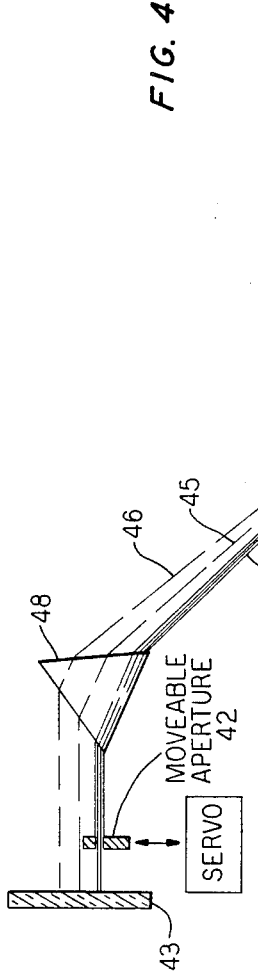

DYE LASER WITH PUMP CAVITY MODE MATCHED TO LASER RESONATOR

BACKGROUND OF THE INVENTION

This invention relates to optically-pumped lasers.

Optically-pumped lasers have heretofore been pumped by separate coherent radiation sources, i.e., other lasers, or by incoherent pumping sources. When high pump-power density is required, laser pumping sources are necessary in order to allow better matching of the pumping radiation spectrum to the pumped-laser absorption spectrum and to permit better spatial matching of the pump radiation to the useful volume of the pumped-laser active medium.

In the case of a laser optically pumped by another laser, the pumped medium may be a dye in solution and the pumping source a separate laser. In a typical prior device, the pumping threshold power density of the dye laser is sufficiently high that very great effort is required to match the focused pump radiation into the dye solution; nearly exact transverse (two orthogonal orientations), longitudinal, and angular (two orthogonal orientations) alignment is necessary, and the focused volume preferably is exactly matched in extent to the mode volume of the dye laser.

Additionaly, absorbed pump-power density decreases exponentially from the surface of the dye, or other active medium, which is exposed to the pump radiation. Most of the heat generated by the pump radiation in the dye, or other active medium, is generated close to the entrance surface or dye cell window. A sapphire entrance window and fast flow rate have, therefore, been required in prior dye devices to conduct the heat away and alleviate deleterious thermal problems.

SUMMARY OF THE INVENTION

I have discovered an arrangement of an optically-pumped laser with significant advantages over prior arrangements for optically-pumped lasers.

According to my invention, the pumping laser medium and the pumped laser medium share essentially the same optical resonator. This arrangement achieves simultaneous alignment of the two lasers. In other words, both lasers oscillate when only the pumping laser is aligned to produce the pumping oscillation; whereas the prior art required both lasers to be separately aligned. Moreover, this sharing of the same optical resonator provides mode matching of the pumping laser beam and the pumped laser beam if their frequencies do not differ substantially; whereas, the prior art required the pumped and pumping laser to be carefully aligned with respect to one another.

BRIEF DESCRIPTION OF THE DRAWING

Further features and advantages of my invention will become apparent from the following detailed description, taken together with the drawing, in which:

FIGS. 3 and 4 show modifications of the embodiment of FIG. 2 for tuning the frequency of the pumped laser.

DESCRIPTION OF ILLUSTRATIVE EMBODIMENTS

Figure 1:
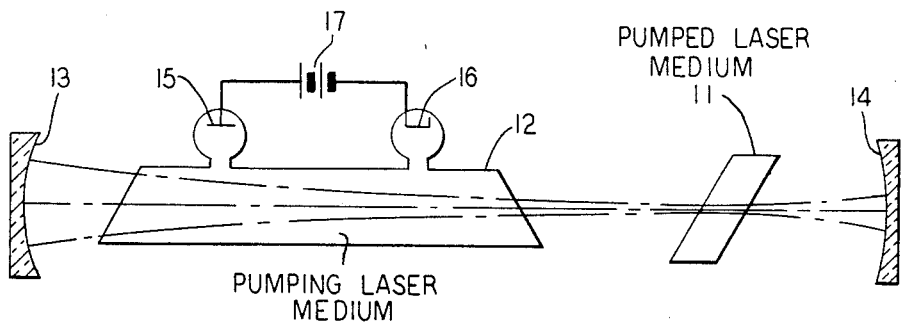
FIG. 1 is a partially-pictorial and partially-schematic illustration of a first embodiment of my invention.

The embodiment of FIG. 1 is a basic embodiment of my invention and is illustrative of the principle that the pumping laser medium 12 and the pumped medium 11 share the same optical resonator formed by the reflectors 13 and 14. These reflectors are illustratively focusing types of reflectors selected and arranged to provide the waist, the smallest cross-sectional diameter, of the pumping laser beam in the pumped laser medium 11.

The pumped laser medium 11 is illustratively a dye cell including rhodamine 6-G dye in either water or methanol as solvent. The cell has Brewster-angle end windows in the path of the pumping radiation, as shown.

The pumping laser 12 is illustratively an argon ion laser operating at 4880 Angstrom units in the blue portion of the spectrum at a power level sufficient to pump medium 11 above threshold. In actual experimental pulsed operation, additional output power has been obtained from the argon ion laser at 4765 Angstroms, which power also contributes to usable pump power in dye cell 11. The pumping power level just providing oscillation is the threshold; and it depends upon the rate of flow of medium 11 which is provided (by means not shown) to minimize the effects of bleaching of the dye and some thermal refractive index gradient effects.

The intracavity dye laser arrangement of FIG. 1 has several advantages over an external pumping arrangement. First, the dye laser is automatically aligned for optimum oscillation whenever the argon pumping laser is aligned for optimum oscillation since both oscillate in the same optical cavity. In an external pumping scheme, very accurate alignment and mode matching of the focused pump source with the dye laser optical cavity are required.

Another important feature of intracavity pumping is that thermal problems are reduced, as compared to externally-pumped arrangements.

In an externally-pumped system, the concentration of the dye is adjusted to absorb all of the incident pump light. Since the absorption is exponential in distance from the input cell window, most of the heat is generated close to the window surface. A sapphire input window substrate and a fast flow rate have, therefore, been required in prior devices.

In the intracavity system of FIG. 1, the concentration is adjusted to couple the maximum amount of power into the dye medium 11 from the argon standing wave laser 12. This concentration is substantially lower than in externally pumped systems. The heat is, therefore, generated nearly uniformly along the pumping axis even though the total heat dissipated is about the same as in the external pumping scheme. This is especially important if the inside surfaces of the cell windows have dielectric coatings. With the intracavity scheme, I have been able to use Brewster-angle cells for medium 11 made from Pyrex or fused silica and still obtain low-noise operation.

Figure 2:
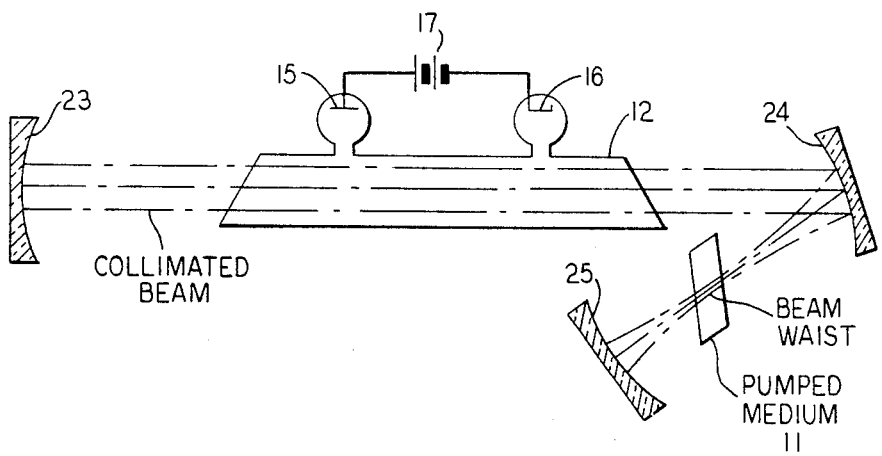
FIG. 2 is a partially-pictorial and partially-schematic illustration of an early experimental embodient of my invention.

An improved embodiment of my invention, which I have used to obtain continuous-wave dye laser oscillation, is shown in FIG. 2. This embodiment has all the advantages basic to the embodiment of FIG. 1, plus the possibility of a smaller beam waist in medium 11 to lower the threshold beam power required for dye laser oscillation. It will be noted that the three-mirror cavity formed by focusing reflectors 23 through 25 provides a collimated laser beam in pumping laser medium 12 and a highly-focused pumping laser beam in the pumped dye laser medium 11. In other respects, the constituents of the embodiment of FIG. 2 are similar to those of FIG. 1. To reduce coma due to the tilt of the reflector 24 with respect to the beam path, the angle between the folded portions of the optical path was kept as small as physically possible in my experiments.

It should be noted that the Brewster angle of the entrance and exit surfaces of medium lies in the plane of the folded beam path.

The operation of the embodiment of FIG. 2 should be contrasted with that of similar intracavity pumping of devices that have been used for substantially different purposes in the prior art. Three-mirror resonators similar to the one shown in FIG. 2 have previously been used to obtain the small beam waists necessary for high-speed acoustic cavity dumping and for other intracavity modulation techniques. Nevertheless, to my knowledge, such an arrangement has never been used to provide a common optical resonator for two different laser media.

It is important to my invention only that the optical cavities be common through both laser media in order to obtain most of the advantage of automatic alignment of the two lasers upon alignment of the pumping laser. In FIG. 3 it is shown how the dye laser can be tuned by a branching of the resonator for the pumping and pumped radiations beyond the common portion of the path, which extends through both laser media. Specifically, a frequency-dispersive prism 37 is inserted at the end of the common path to bend the pumping laser radiation path toward reflector 33, which is similar to reflector 23 of FIG. 2. The same prism 37 will bend the dye laser radiation, which has a longer wavelength, through a lesser angle, toward the reflector 36 which has a curvature similar to that of reflector 33 and a nearly equal spacing from prism 37, as compared to that of reflector 33.

At least for the case of a dye laser optically pumped by another laser, the oscillation bandwidth of the pumped medium is great enough that coarse tuning can be achieved by changing the angle of alignment of reflector 36 from prism 37. Different portions of the dye laser radiation will be bent through different angles by prism 37 because of the frequency dispersion of prism 37. It should be noted that any transparent and dispersive dielectric is suitable for prism 37; but it illustratively could be fused silica.

With respect to the alignment features of the embodiment of FIG. 3, it should be pointed out that reflectors 33 through 35 and prism 37 are adjusted in alignment until the pumping laser 12 oscillates at one of its wavelengths, for example, 4880 Angstroms when using an argon ion pump. The beam position on the side of prism 37 nearest mirror 33 is noted. Another pump-laser wavelength is tuned to oscillate by readjusting mirror 33. For argon, this could be the 5145 Angstrom line. This beam will emerge from the prism 33 at a slightly different location due to the dispersion of prism 33. Mirror 36 is adjusted so that its surface perpendicularly intersects the plane determined by the two pump-laser beams. Mirror 36 then is angularly adjusted so that the normal to the mirror surface is moved within that determined plane, and for various such angular adjustments the optical cavity consisting of mirrors 34, 35 and 36 will be resonant for various wavelengths within the broad wavelength band of the laser dye.

Another tuning arrangement can be made, as in FIG. 4, wherein the advantage of automatic simultaneous alignment of the pumping and pumped lasers is completely retained. Two prisms, 47 and 48, are employed and mirror 43 is flat. The apex angle of the prism 60 is selected for the average laser wavelength and the prism material such that angles of incidence and exit, 62 and 61, are equal to Breswster's s angle. Both prisms 47 and 48 are identically constructed and analogously placed with respect to the incident beams. The prisms and mirrors are aligned so that two or more of the different-wavelength pump-laser spectral lines will oscillate simultaneously. For an argon ion pump, these lines might be at 4880 Angstroms and 5145 Angstroms, which would follow paths 46 and 45, respectively, in FIG. 4. The entire resonator would then be automatically aligned for all nearby wavelengths including those radiated by the pumped laser 11, for example, a dye. Laser beams of different wavelengths are incident on mirror 43 parallel to but displaced sideways from one another. If the aperture of slit or diaphragm 42 is just the size of the single-wavelength beam in the lowest-order transverse mode at mirror 43, then sideways motion of slit or diaphragm 42 in the dye laser beam will select out a narrow spectral component within the broad dye band and allow tuning without affecting the pumping laser beam, here 4880 Angstroms or 5145 Angstroms, or both. Note that lines 45 and 46 and band of lines 44 indicate only the center line of the various differing-frequency beams, all of which are finite-diameter collimated beams of the type appearing in FIG. 2 at mirror 23.

Further details illustratively applicable to all of the embodiments of FIGS. 1 through 4 are the following: Dye laser cells were constructed of 1 millimeter thick fused silica flats spaced 1.25 millimeters apart with a 2 millimeter channel in which the dye solution flowed transverse to the laser axis. The flow rate was approximately 30 cm/sec for continuous laser output; no flow was required for pulsed operation. Cell windows were made thin in order to minimize ellipticity of the focal spot resulting from introduction of the cell at Brewster's angle in the focused beam. The cavity mirrors were broadband high reflectors from 4700 Angstroms to 6200 Angstroms. Output was initially obtained from reflections from the cell windows or pump-laser windows. Radii of curvature in FIG. 2 were 5 centimeters for reflector 25, 10 centimeters for reflector 24, and 3 meters for reflector 23. The dye used in my experiments was National biological strain rhodamine 6–G, manufactured by Allied Chemical, with no extra purification. Methanol was used as the solvent, and continuous dye laser operation was achieved with less than 25 percent noise amplitude.

Other illustrative embodiments applicable are the following: Dye laser cells were constructed of 0.22 millimeter thick quartz or Pyrex flats. The dye flow rate could be adjusted as high as 7 meters per second. The cavity mirrors were broadband high reflectors from 4800 Angstroms to 5800 Angstroms except that one reflector transmitted a few percent of the dye laser power. Losses of all the reflectors at 4880 Angstroms were all small compared to the insertion loss of the dye.

Radius of curvature for reflector 23 was variously selected from 3 meters to ∞ in different experiments. The dye used was rhodamine 6-G as manufactured by British Drug Houses Limited. Both water with 1.5 percent Ammonyx LO, and methanol, were tried as solvents. True continuous operation was obtained with both solvents although the aqueous solution resulted in better low-noise performance. Dye laser action was observed with less than 5 percent noise amplitude with water and approximately 20 percent noise amplitude with methanol. Continuous laser action was observed with flow rates as low as 10 cm/sec. Other descriptive specific details are the same as the previous illustrative details.

Figure 5:
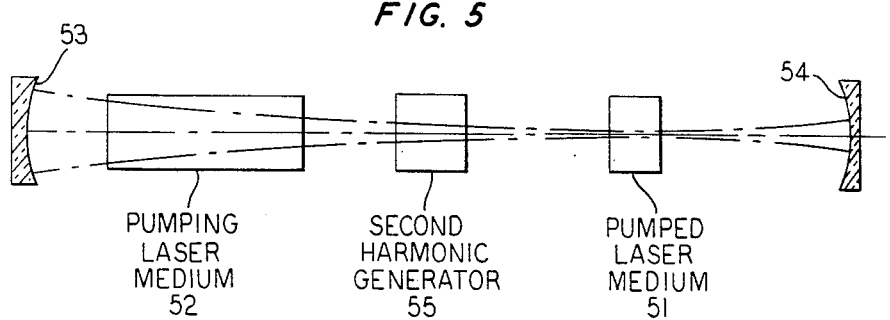
FIG. 5 shows a modification of the embodiment of FIG. 1 adapted to use a dielectric rod laser and a second-harmonic generator to provide the pumping radiation.

It should be noted that it is not necessary for the pumping laser medium to be a gas laser medium. Even for the specific case in which the pumped laser medium is a dye oscillating in the visible region of the spectrum, it is entirely feasible to double many solid-state laser infrared radiations to obtain suitable pumping radiation. Such an embodiment is shown in FIG. 5. In FIG. 5, as in FIG. 1, the end reflectors 53 and 54 are curved and spaced to form the beam waist in the pumped laser medium 51, which is illustratively the same dye as used in the previous embodiments, although it need not be placed in a cell with Brewster-angle end windows. The pumping laser radiation is illustratively provided by a solid-state laser medium 52 and the aligned second-harmonic generation medium 55.

More specifically, the pumping laser medium 52 is advantageously a neodymium-ion laser employing neodymium ions in an uttrium aluminum garnet host or a glass host and providing oscillations at about 1.06 micrometers. The second-harmonic generation medium 55 is illustratively a single crystal of barium sodium niobate or of cadmium-mercury thiocyanate, both of which are capable of providing the coherent second-harmonic generation at 0.53 micrometer. The latter wavelength is suitable for pumping the dye laser medium 51. Folded cavity modifications of FIG. 5 similar to those of FIGS. 2, 3 and 4 may also be devised.

It should further be apparent that it is not necessary for the pumped laser medium 11 to be a dye laser medium. It is merely necessary that it be an optically-pumpable laser medium. In those cases in which the laser wavelength of the pumped and pumping media differ more greatly than in the illustrative embodiments, it should be noted that the mode-matching advantages of a common resonator are reduced. Nevertheless, the mode-matching advantage is not central to the achievement of simultaneous alignment of the two lasers, which is characteristic of my invention.

I claim:
1. A laser comprising in combination
a first active laser medium capable of providing the stimulated emission of a first beam of optical radiation,
means coupled to said first medium for creating a population inversion therein, resonator means coupled to at least said first medium for stimulating the emission of said first beam from said first medium,
a second active laser medium capable of providing the stimulated emission of a second beam of optical radiation of lower frequency than the frequency of said first beam upon being pumped by said first beam, said second medium comprising a cell containing a dye in solution, the concentration of the dye in said cell being adjusted to transmit a substantial portion of said first beam upon incidence, said dye being selected to make the difference of said frequencies substantially less than either of said frequencies,
wherein said resonator means comprises first and second end reflectors encompassing both of said media and a third reflector disposed between said first and second media, said third reflector being tilted with respect to the respective axes of said first and second reflectors to define a folded path along which said beams can oscillate, said resonator being capable of simultaneously resonating said beams,
said second and third reflectors being curved reflectors with respective curvatures to provide said first beam with a minimum cross-sectional diameter in the region between said second and third reflectors,
said second medium being positioned between said second and third reflectors in the path of said first beam at the minimum cross-sectional diameter thereof to be pumped thereby, so that said first and second beams are substantially matched in beam shape and share a common path throughout said resonator.

* * * * *